United States Patent [19]
Okuno et al.

[11] Patent Number: 5,943,938
[45] Date of Patent: Aug. 31, 1999

[54] BRAKE BOOSTER

[75] Inventors: Tsuyoshi Okuno; Hitoshi Takaku, both of Saitama-ken, Japan

[73] Assignee: Jidosha Kiki Co., Ltd., Tokyo, Japan

[21] Appl. No.: 09/108,621

[22] Filed: Jul. 1, 1998

[30] Foreign Application Priority Data

Aug. 15, 1997 [JP] Japan .................................. 9-235407

[51] Int. Cl.⁶ .................................................. F15B 9/10
[52] U.S. Cl. ............................................................ 91/369.2
[58] Field of Search .............................. 91/369.2, 369.3

[56] References Cited

U.S. PATENT DOCUMENTS

| | | | |
|---|---|---|---|
| 4,719,842 | 1/1988 | Gautier | 91/369.2 |
| 5,046,398 | 9/1991 | Hamamiya et al. | |
| 5,433,135 | 7/1995 | Watanabe | |

FOREIGN PATENT DOCUMENTS

| | | | |
|---|---|---|---|
| 99255 | 5/1987 | Japan | 91/369.2 |
| 257760 | 9/1992 | Japan | 91/369.2 |

*Primary Examiner*—F. Daniel Lopez
*Attorney, Agent, or Firm*—Flynn, Thiel, Boutell & Tanis, P.C.

[57] ABSTRACT

A rubber damper is disposed between a valve plunger, which forms a valve mechanism of a brake booster, and a plate plunger. An air gap is defined around the outer and the inner periphery of the rubber damper to permit an elastic deformation of the rubber damper. When a brake pedal is further depressed under a servo balance condition, the valve plunger compresses the rubber damper, whereby it is driven forward. This arrangement allows a force of depression required when the brake pedal is further depressed under the servo balance condition to be reduced relative to the force of depression required in a conventional arrangement in which the valve plunger must be driven forward by compressing a reaction disc which is surrounded by an output shaft, a valve body and a valve plunger. As a consequence, the response of the brake booster is improved.

6 Claims, 6 Drawing Sheets

BRAKE BOOSTER

FIELD OF THE INVENTION

The invention relates to a brake booster for use in a braking unit of an automobile.

DESCRIPTION OF THE PRIOR ART

In a conventional arrangement, a brake booster generally comprises a valve body slidably disposed within a shell, a valve plunger slidably mounted on the valve body and forming a valve mechanism, an input shaft arranged to drive the valve plunger back and forth to switch a flow path in the valve mechanism, an output shaft slidably disposed on the valve body, and a reaction disc interposed between one end of the output shaft and the valve plunger. In operation, a brake reaction applied to the output shaft is transmitted to a driver through the reaction disc, the valve plunger, the input shaft and a brake pedal.

In a brake booster of the kind described, a depression of the brake pedal under a servo balance condition required a force of depression of a relatively high magnitude. Specifically, the reaction disc has its front end face surrounded by the rear end face of the output shaft, its outer peripheral surface surrounded by the inner peripheral surface of the output shaft or by the inner peripheral surface of the valve body, and its rear end face surrounded by the front end face of the valve body and by the front end face of the valve plunger. Accordingly, in order to drive the valve plunger forwardly by depressing the brake pedal under the servo balance condition, it is necessary to further compress the reaction disc in the space in which it is surrounded, thus requiring a force of depression of a relatively high magnitude. This prevented a female or aged driver of less physical ability from driving the valve plunger forward enough, resulting in a disadvantage that the valve opening in the valve mechanism is reduced to degrade the response of the brake booster.

SUMMARY OF THE INVENTION

In view of the foregoing, it is an object of the invention to provide a brake booster in which the force of depression required in further depressing a brake pedal under a servo balance condition can be reduced as compared with that required in the prior art brake booster, permitting an improvement in the response.

Specifically, in a brake booster comprising a valve body slidably disposed within a shell, a valve plunger slidably mounted on the valve body and forming a valve mechanism, an input shaft arranged to drive the valve plunger back and forth to switch a flow path in the valve mechanism, an output shaft slidably disposed on the valve body, and a reaction disc interposed between one end of the output shaft and the valve plunger, according to a first aspect of the invention, a rubber damper is disposed between the reaction disc and the valve plunger so that a brake reaction from the output shaft is transmitted through the reaction disc, the rubber damper and the valve plunger to the input shaft, and an air space is defined around the outer or the inner periphery of the rubber damper to permit an elastic deformation of the rubber damper.

According to a second aspect of the invention, in the brake booster constructed as mentioned above, a rubber damper is disposed between the reaction disc and the valve plunger, which is allowed to extend through the rubber damper so as to define a first reaction transmission path which causes a brake reaction from the output shaft to be transmitted through the reaction disc, the rubber damper and the valve plunger to the input shaft and a second reaction transmission path which causes a brake reaction from the output shaft to be transmitted from the reaction disc to the valve plunger and the input shaft without being transmitted through the rubber damper, and an air gap is defined around the outer or the inner periphery of the rubber damper to permit an elastic deformation of the rubber damper.

In accordance with the first aspect of the invention, the air gap which is defined around the outer or the inner periphery of the rubber damper to permit its elastic deformation allows the rubber damper to be more easily compressed or deformed than the reaction disc which is confined in a surrounded space when the brake pedal is further depressed under the servo balance condition, with consequence that the valve plunger can be driven forward through an increased travel with a relatively reduced magnitude of force, thus improving the response of the brake booster.

In accordance with the second aspect of the invention, when the brake pedal is further depressed under the servo balance condition, the valve plunger is effective in the second reaction transmission path to compress the reaction disc confined in the surrounded space, but because the first reaction transmission path includes the rubber damper, around the outer or the inner periphery of which the air gap is defined to permit its elastic deformation, the force of depression applied to the reaction disc from the valve plunger through the second reaction transmission path is transmitted from the reaction disc to the rubber damper in the first reaction transmission path, thus compressing the rubber damper. As a consequence, the valve plunger can be driven forward through an increased travel with a relatively reduced magnitude of force, as described in connection with the first aspect of the invention, again improving the response of the brake booster.

Above and other objects, features and advantages of the invention will become apparent from the following description of several embodiments thereof with reference to the attached drawings.

DETAILED DESCRIPTION OF THE EMBODIMENTS

Figure 1:
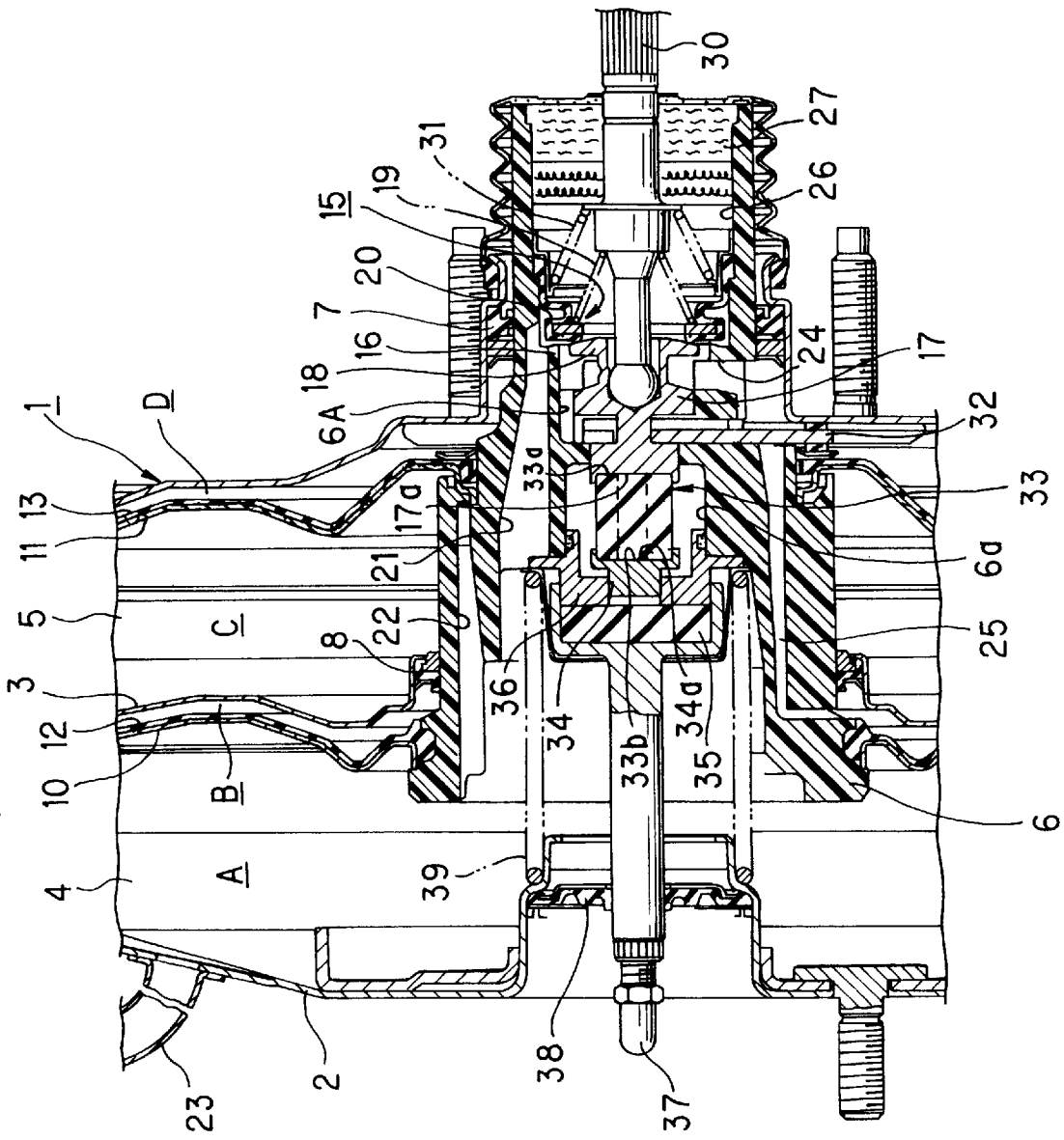
FIG. 1 is a cross section showing a first embodiment of the invention.

Referring to the drawings, several embodiments of the invention will be described. Referring to FIG. 1, there is shown a tandem brake booster 1 including a shell 2, the interior of which is partitioned by a centerplate 3 into a front chamber 4 and a rear chamber 5. A tubular valve body 6 slidably extends through the rear end of the shell 2 and the centerplate 3 with seal means 7, 8 maintaining a hermetic seal therebetween.

A front power piston 10 and a rear power piston 11 are connected around the outer periphery of the valve body 6 in regions which are located in the front chamber 4 and the rear chamber 5, respectively. A front diaphragm 12 and a rear diaphragm 13 are applied to the back surfaces of the power pistons 10 and 11, respectively. In this manner, a constant pressure chamber A and a variable pressure chamber B are defined across the front diaphragm 12 within the front chamber 4 while a constant pressure chamber C and a variable pressure chamber D are defined across the rear diaphragm 13 within the rear chamber 5.

A valve mechanism 15 which switches a communication between the constant pressure chambers A, C and the variable pressure chambers B, D is disposed within the valve body 6. The valve mechanism 15 comprises an annular vacuum valve seat 16 formed on the valve body 6, an annular atmosphere valve seat 18 formed on a rear portion of a valve plunger 17 which is in turn slidably disposed in a through-opening 6A formed in the valve body 6 at a location radially inward of the vacuum valve seat 16, and a valve element 20 which is urged by a poppet return spring 19 to be seated on either valve seat 16 or 18.

A space located radially outward of an annular seat area on the valve element 20 which moves into engagement with or disengagement from the vacuum valve seat 16 communicates with the constant pressure chamber A through a first constant pressure passage 21 formed in the valve body 6, and the interior of the constant pressure chamber A communicates with the constant pressure chamber C through a second constant pressure passage 22. The constant pressure passage A communicates with a source of negative pressure, not shown, through a tubing 23, whereby the negative pressure is normally introduced into the constant pressure chambers A, C.

A space located radially inward of the annular seat on the valve element 20 which moves into engagement with or disengagement from the vacuum valve seat 16, but which is located radially outward of a seat area on the valve element 20 which moves into engagement with or disengagement from the atmosphere valve seat 18 communicates with the variable pressure chamber D through a radial first variable pressure passage 24 formed in the valve body 6, the variable pressure chamber D communicating with the variable pressure chamber B through a second variable pressure passage 25 formed in the valve body 6.

Finally, a space located radially inward of the annular seat on the valve body 20 which moves into engagement with or disengagement from the atmosphere valve seat 18 communicates with the atmosphere through a pressure passage 26 formed in the valve body 6 and a filter 27 disposed therein.

The right end of the valve plunger 17 is pivotally connected with a distal end of an input shaft 30, and a valve return spring 31 having a greater resilience than the poppet return spring 19 is disposed between the input shaft 30 and the valve body 6, thus normally causing the valve element 20 to be seated upon the atmosphere valve seat 18 on the valve plunger 17 while maintaining it away from the vacuum valve seat 16 on the valve body 6. The other end of the input shaft 30 is mechanically connected to a brake pedal, not shown.

The valve plunger 17 is prevented from being disengaged from the valve body 6 by means of a key member 32. The key member 32 is movable back and forth axially of the valve body 6, and when the brake booster 1 is inoperative, the key member abuts against the inner surface of the shell 2 to maintain the valve plunger 17 at an advanced position relative to the valve body 6, thus allowing a lost motion of the input shaft 30 at the commencement of operation of the brake booster to be reduced.

A rubber damper 33, to be described later in detail, a plate plunger 34 and a reaction disc 35 are sequentially disposed forwardly of the valve plunger 17. The plate plunger 34 is slidably fitted into a holder 36 secured in the front end face of the valve body 6 in a manner maintaining a hermetic seal, while the reaction disc 35 is received in a recess formed in one end of an output shaft 37. The recess formed in one end of the output shaft 37 is slidably fitted around the outer peripheral surface of the holder 36 while the distal end of the output shaft 37 projects externally of the shell 2 while maintaining a hermetic seal by means of a seal member 38 for connection with a piston of a master cylinder, not shown.

Accordingly, a brake reaction which is transmitted from the piston of the master cylinder is transmitted through the output shaft 37 to the reaction disc 35, and is thence transmitted through the holder 36 to be accepted by the valve body 6 to be transmitted through the plate plunger 34, the rubber damper 33, the valve plunger 17 and the input shaft 30 to a brake pedal, not shown.

The valve body 6 and the power pistons 10, 11 are normally maintained in their inoperative positions shown by a return spring 39 disposed between the shell 2 and the valve body 6.

The rubber damper 33 which transmits the brake reaction to the valve plunger 17 is formed into a cylindrical configuration from rubber or equivalent elastomer, and includes a rear end 33a which is fitted into a shallow recess 17a formed in the front end face of the valve plunger 17 and which is integrally connected to the valve plunger by an adhesive. On the other hand, the front end 33b of the rubber damper 33 is fitted into a shallow recess 34a formed in the rear end of the plate plunger 34 and is integrally connected to the plate plunger 34 by an adhesive, whereby the valve plunger 17 and the plate plunger 34 are connected together through the rubber damper 33 so as to be axially displaceable relative to each other.

Under the inoperative condition when the brake pedal is not depressed, a clearance is formed between the front end face of the plate plunger 34 and the rear end face of the reaction disc 35 to provide a so-called jumping response.

The rubber damper 33 is axially compressed and deformed when a brake reaction is applied thereto. However, in the embodiment shown, to adjust an optimum relationship between the load and the deformation, the rubber damper 33 is made hollow by forming an opening therein, and the magnitude of the internal diameter and the hardness of the elastomer are chosen to suitable values. If required, the rubber damper 33 may be formed of a solid elastomer, or the number of openings may be increased or the cross-sectional shape of the elastomer or opening can be changed.

The through-opening 6A includes a portion 6a of an increased diameter in which the rubber damper 33 is disposed, and a sufficient clearance is formed between the portion 6a and the rubber damper 33 to prevent an elastic deformation of the rubber damper 33 in a direction radially outward from being impeded. The rear end of the holder 36 which is fitted into the portion 6a of an increased diameter is also designed to prevent an elastic deformation of the rubber damper 33 from being impeded.

With the described arrangement, when the brake pedal, not shown, is depressed, the input shaft 30, the valve plunger 17, the rubber damper 33 and the plate plunger 34 are integrally driven forward from the condition shown in FIG. 1, and as the valve plunger 17 is driven forward, the flow path in the valve mechanism 15 is switched in the similar manner as in the conventional brake booster. Specifically, the valve element 20 abuts against the vacuum valve seat 16 to interrupt the communication between the constant pressure chambers A, C and the variable pressure chambers B, D, and the valve element 20 moves away from the atmosphere valve seat 18 to cause the variable pressure chambers B, D to communicate with the atmosphere through the atmosphere passage 26, whereby the atmosphere is supplied into the variable pressure chambers B, D, causing the valve body 6 and the output shaft 37 to be driven forward under a pressure differential between the constant pressure chambers A, C and the variable pressure chambers B, D to develop a braking liquid pressure in the master cylinder.

A brake reaction which results from the braking liquid pressure is transmitted from the output shaft 37 through the reaction disc 35, the plate plunger 34, the rubber damper 33, the valve plunger 17 and the input shaft 30 to the brake pedal.

Figure 2:
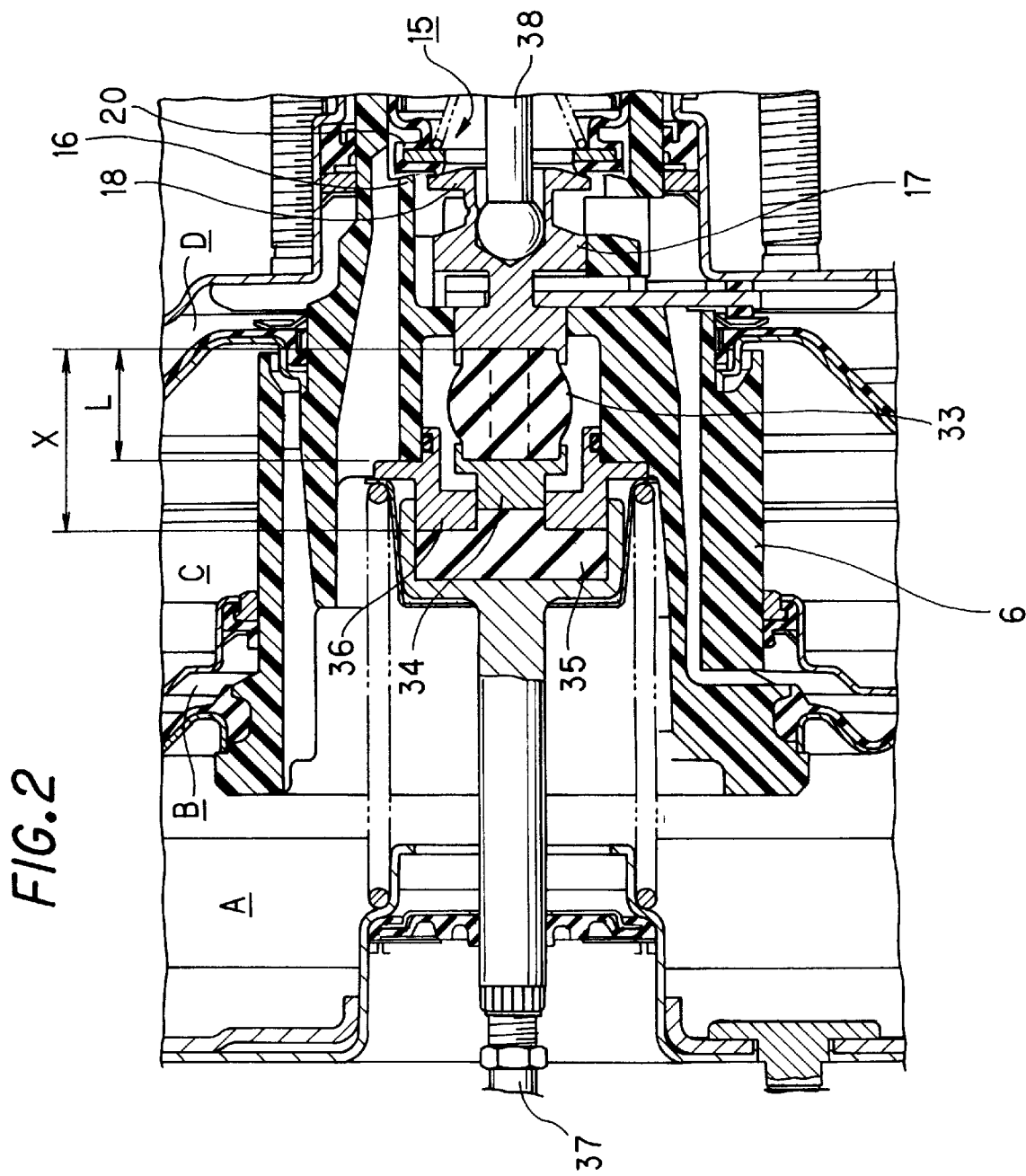
FIG. 2 is a cross section, to an enlarged scale, showing a servo balance condition in FIG. 1.

When an increase in the force of depressing the brake pedal ceases under the condition mentioned above, the brake booster reaches a servo balance condition shown in FIG. 2. In this servo balance condition, the valve plunger 17 assumes always an identical position relative to the valve body 6 irrespective of the magnitude of the force depressing the brake pedal. In other words, it is necessary that the valve element 20 be seated on the vacuum valve seat 16 on the valve body 6 and the atmosphere valve seat 18 on the valve plunger 17 simultaneously, and accordingly, the spacing X between the front end face of the valve plunger 17 and the front end face of the holder 36 is maintained constant.

On the other hand, the brake reaction is transmitted through the reaction disc 35 to cause the plate plunger 34 to be displaced to the right relative to the holder 36, whereby the rubber damper 33 is compressed by the brake reaction. The axial size L of the rubber damper 33 in its compressed condition, or the spacing L between the rear end face of the plate plunger 34 and the front end face of the valve plunger 17, is determined in accordance with the magnitude of the brake reaction.

When the brake pedal is further depressed under the servo balance condition, both the reaction disc 35 and the plate plunger 34 are substantially maintained as in the servo balance condition, while the rubber damper 33 is compressed and deformed to permit the valve plunger 17 to be driven forward. As the valve plunger 17 is driven forward, a flow path in the valve mechanism 15 is switched, further supplying the atmosphere into the variable pressure chambers B, D to drive the valve body 6 and the output shaft 37 forward, thereby increasing the braking liquid pressure.

Considering a conventional brake booster which is not provided with the rubber damper 33 mentioned above, but in which the plate plunger 34 and the valve plunger 17 are disposed in direct abutment against each other, as the brake pedal is further depressed under the servo balance condition mentioned above, it is necessary that the reaction disc 35 be further compressed to allow the plate plunger 34 and the valve plunger 17 to be driven forward in an integral manner.

However, since the reaction disc 35 is contained in the space which is surrounded by the recess in the output shaft 35 and the holder 35 without leaving any clearance therebetween, it is relatively difficult to achieve a further compression of the reaction disc 35 to allow the valve plunger 17 to be driven forward significantly.

By contrast, in the present embodiment, an air gap is defined around the inner and the outer periphery of the rubber damper 33, and accordingly, an elastic deformation of the rubber damper is easily achieved, allowing the valve plunger 17 to be driven forward significantly with a relatively small increase in the force of depression. Consequently, the response of the brake booster can be improved even with a small increase in the force of depression.

As mentioned previously, the axial size L of the rubber damper 33 depends on the magnitude of the brake reaction, but because part of the reaction which is transmitted from the rubber damper 33 to the valve plunger 17 is dissipated in overcoming the deformation resistance of the rubber damper 33, the servo ratio increases as compared with the conventional brake booster which is not provided with a rubber damper 33.

In other words, when it is desired to set up a servo ratio comparable to the prior art, the area of the plate plunger 34 which contacts the reaction disc 35 can be increased, thus enhancing the durability of the reaction disc 35.

Figure 3:
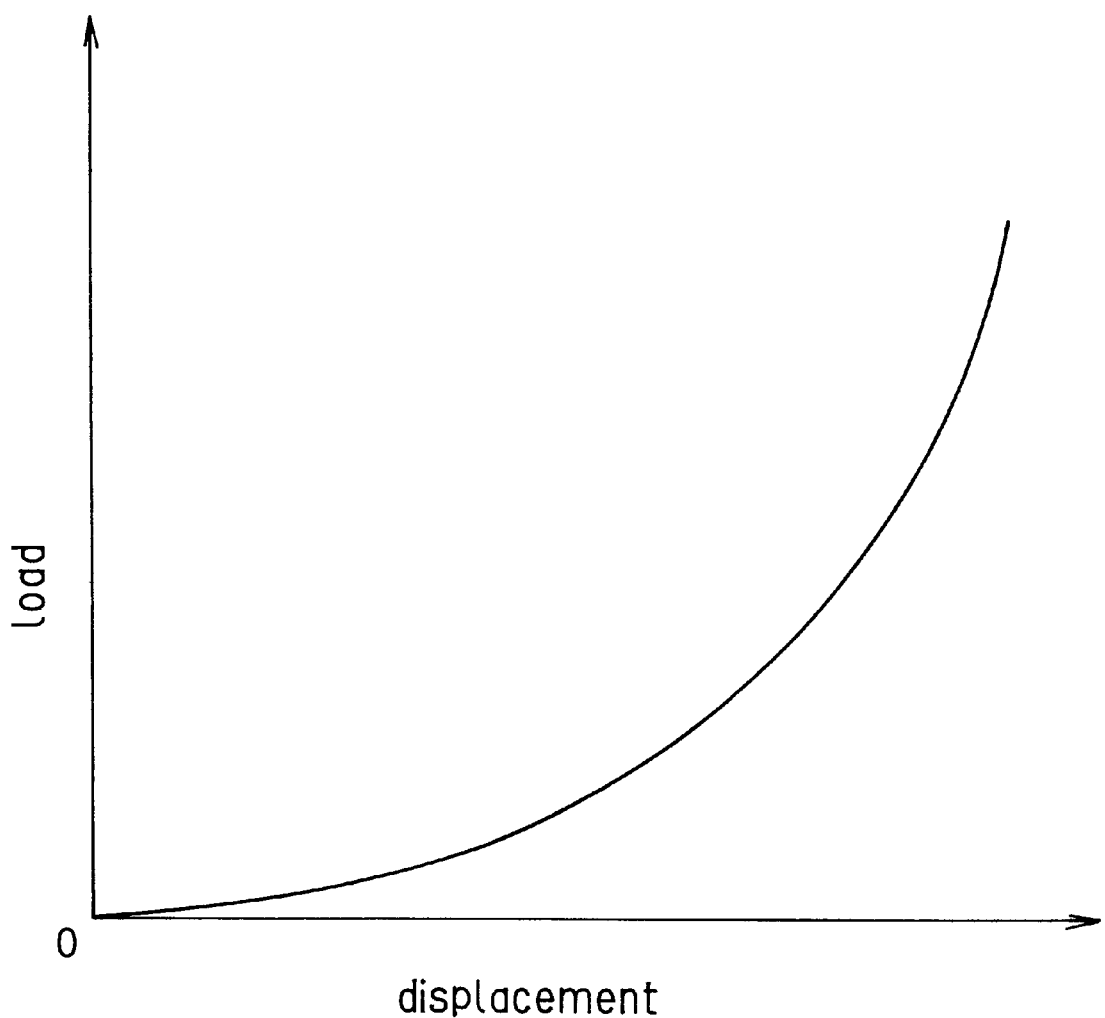
FIG. 3 graphically shows a characteristic response of a rubber damper 33.

The relationship between the load and the displacement (a change in the length) of the rubber damper 33 is generally non-linear such that the displacement becomes reduced as the load increases, as shown in FIG. 3, and accordingly, by suitably choosing the non-linearity, it is possible to set up a response for the brake booster so that the servo ratio increases as the output increases or such that the servo ratio decreases as the output increases.

Figure 4:
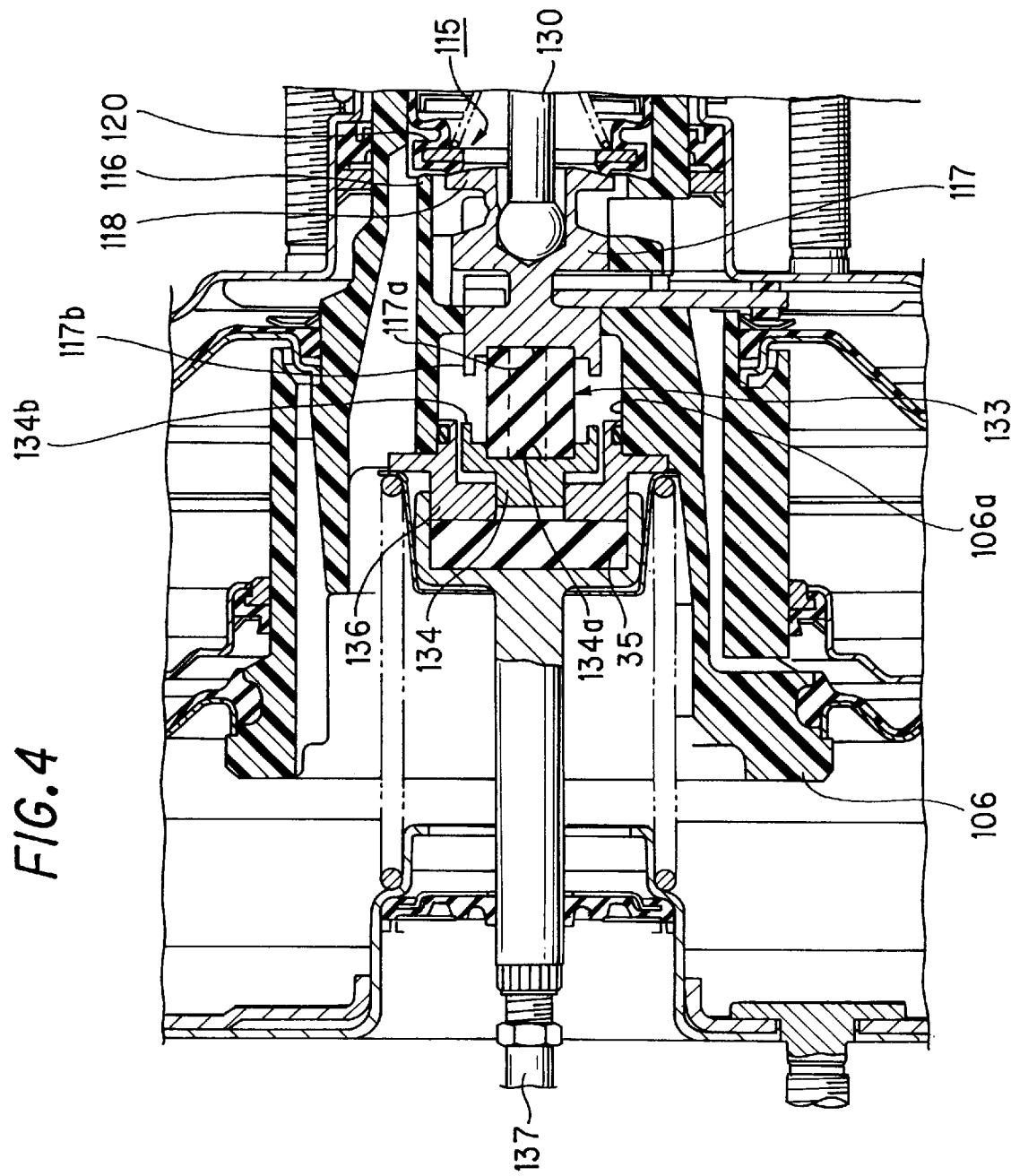
FIG. 4 is a cross section, to an enlarged scale, of a second embodiment of the invention.

FIG. 4 shows a second embodiment of the invention. In the first embodiment, an abutment between the valve plunger 17 and the plate plunger 34 is avoided before a full load condition. However, the present embodiment is designed such that an abutment of a valve plunger 117 against a plate plunger 134 occurs before the full load condition.

Specifically, in the present embodiment, the front end face of the valve plunger 117 is formed with an annular projection 117*b* which projects forwardly through a relatively large distance. The rear end face of the plate plunger 134 is formed with an annular projection 134*b* which projects rearwardly through a relatively large distance.

A spacing between the both annular projections 117*b*, 134*b* is chosen such that an abutment between the both members occur immediately before the full load condition of the brake booster when a rubber damper 133 is axially compressed and deformed. In other respects, the arrangement remains similar to that described in connection with the first embodiment, and corresponding parts to those shown in the first embodiment are designated by like numerals as used in the description of the first embodiment, to which "100" is added.

In the second embodiment constructed in the manner mentioned above, the brake booster can be operated with a good response with a small increase in the force of the depression as in the first embodiment. Since the plate plunger 134 can be brought into abutment against the valve plunger 117 before the full load condition in the present embodiment, under this condition, the brake reaction which is acting upon an output shaft 137 can be transmitted to an input shaft 130 through a reaction disc 135, the plate plunger 134 and the valve plunger 117, without being transmitted through the rubber damper 133. Under this condition, the servo ratio can be reduced in the similar manner as in a conventional brake booster which is not provided with a rubber damper 133.

Thus, as indicated in FIG. 3, the relationship between the load and displacement of the rubber damper 33 changes as a quadratic function, and accordingly, the servo ratio of the brake booster changes in the similar manner. The brake booster eventually reaches a full load condition, but the servo ratio which is attained immediately before the full load condition is significantly high, and when the full load condition is reached, the servo ratio will be reduced drastically and rapidly. As a consequence, as soon as the full load condition is reached, even though the output increases at a ratio of 1:1 with respect to the force of depression actually, a driver feels as if he can no longer depress the brake pedal any further.

By contrast, in the second embodiment, the abutment of the plate plunger 134 against the valve plunger 117 can be achieved immediately before the full load condition is reached, whereby the servo ratio is reduced in the similar manner as in the conventional brake booster, and hence no strange feeling can be experienced in operating the brake pedal when the full load condition is reached subsequently.

Figure 5:
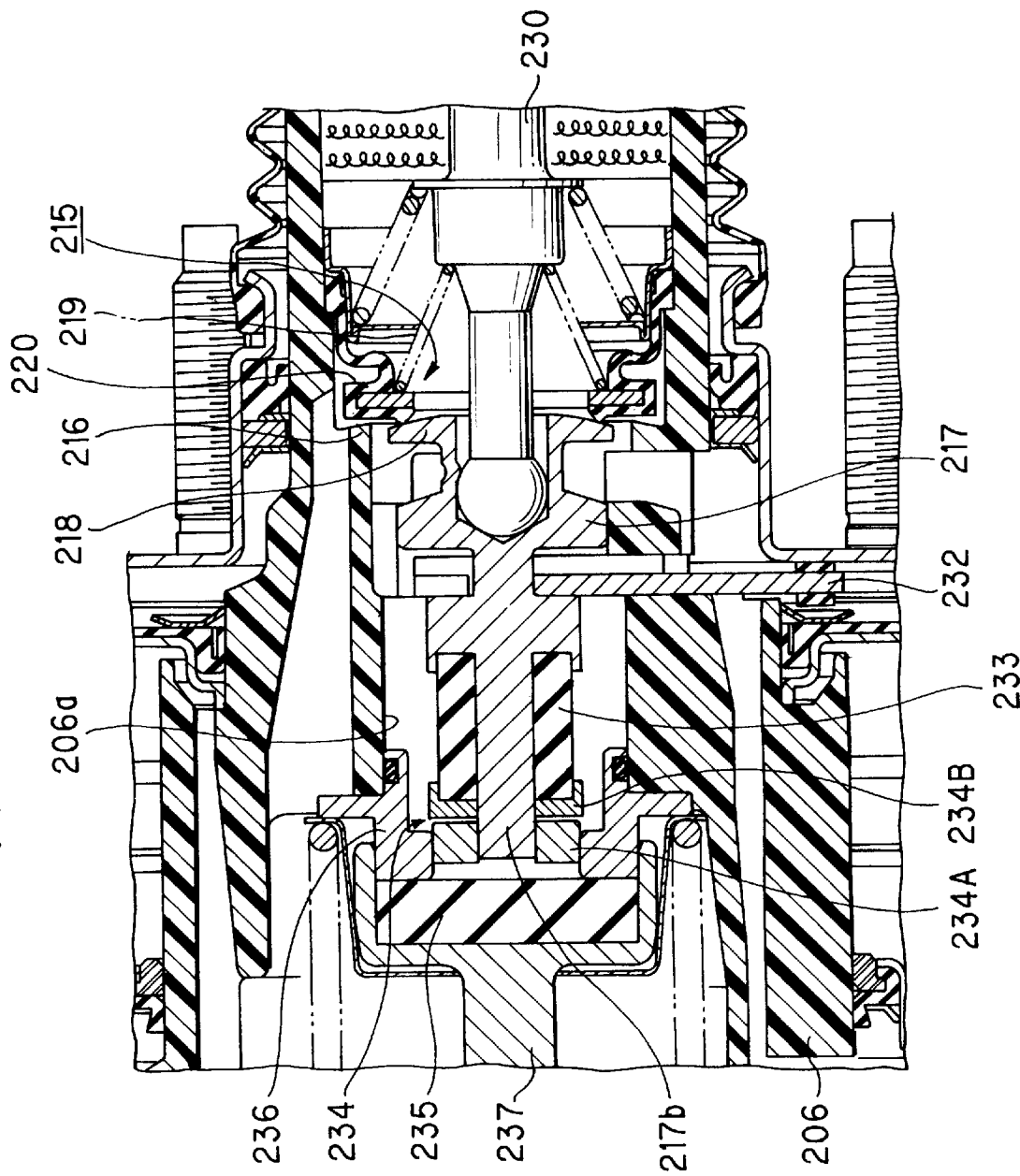
FIG. 5 is a cross section, to an enlarged scale, of a third embodiment of the invention.

FIG. 5 shows a third embodiment of the invention. While the valve plungers 17, 117 are arranged not to abut against the reaction discs 35, 135 in the described embodiments, in the present embodiment, a front end of a valve plunger 217 slidably extends through a plate plunger 234 so as to be capable of being directly abutting against a reaction disc 235.

A cylindrical rubber damper 233 is fitted around the front end of the valve plunger 217, and a portion 206a of an increased diameter in which the rubber damper 233 is disposed has a sufficient clearance with respect to the rubber damper 233 to avoid any impediment of an elastic deformation of the rubber damper 233 in a direction radially outward.

The plate plunger 234 comprises a first member 234A which is integrally connected to the valve plunger 217 through the rubber damper 233, and a second member 234B disposed on the front side of the first member 234A so as to be movable relative thereto.

In other respects, the arrangement is similar to that of the first embodiment, and accordingly corresponding parts to those used in the first embodiment are designated by like numerals as used in the first embodiment, to which "200" is added.

With this arrangement, when the brake booster is operated, a brake reaction from an output shaft 237 is transmitted to an input shaft 230 through a pair of reaction transmission paths. Specifically, in the first reaction transmission path, a brake reaction from the output shaft 237 is transmitted through the reaction disc 235, the plate plunger 234, the rubber damper 233 and the valve plunger 217 to the input shaft 230. In the second reaction transmission path, a brake reaction from the output shaft 237 is transmitted from the reaction disc 235 directly through the valve plunger 217 to the input shaft 230 without being transmitted through the rubber damper 233.

When the brake pedal is further depressed under the servo balance condition to drive the valve plunger 217 forward to thereby compress the reaction disc 235, the reaction disc 235 is effective through the plate plunger 234 to cause a compression and deformation of the rubber damper 233. This allows the valve plunger 217 to be driven forward more easily as compared with the prior art arrangement. Thus, the valve plunger 217 can be driven forward significantly even with a small increase in the force of depression, thus improving the response of the brake booster.

In particular, when the brake pedal is further depressed under the servo balance condition to drive the valve plunger 217 forward rapidly, the rubber damper 233 is deformed in a relatively easy manner, whereby the brake reaction transmitted from the reaction disc 235 to the valve plunger 217 has a greater proportion in the second reaction transmission path which does not include the rubber damper 233 than in the first reaction transmission path which includes the rubber damper 233. As a consequence, while the brake reaction has been transmitted to the valve plunger 217 through both the first and the second reaction transmission path under the servo balance condition, when the brake pedal is further depressed to drive the valve plunger 217 forward rapidly, the brake reaction which is transmitted to the valve plunger 217 is principally through the second reaction transmission path, thus increasing the servo ratio and allowing a further incremental depression smoothly and with a good response.

It is to be noted that in the third embodiment, the plate plunger 234 may be brought into abutment against the valve plunger 217 before the full load condition is reached, in the similar manner as in the second embodiment.

Figure 6:
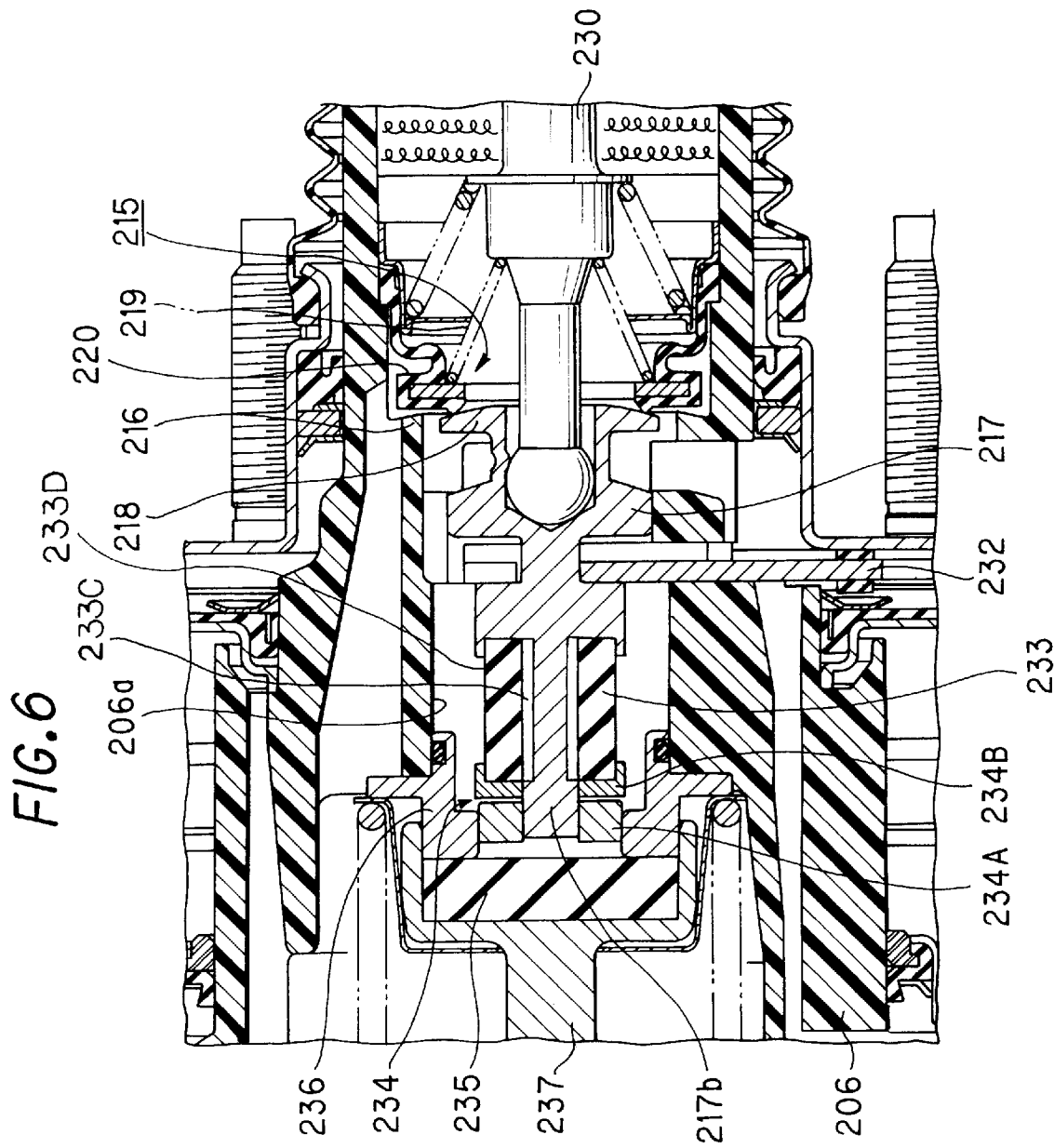
FIG. 6 is a modification of the FIG. 5 embodiment.

FIG. 6 shows a modification of the third (FIG. 5) embodiment of the invention. Air gaps 233C, 233D are respectively defined around the inner or outer periphery of the rubber damper 233.

While the invention has been described above in connection with several embodiments thereof, it should be understood that a number of changes, substitutions and modifications therein are possible from the above disclosure without departing from the spirit and the scope of the invention defined by the appended claims.

What is claimed is:

1. A brake booster comprising a valve body slidably disposed within a shell, a valve plunger slidably mounted on the valve body and forming a valve mechanism, an input shaft for driving the valve plunger back and forth to switch a flow path in the valve mechanism, an output shaft slidably mounted on the valve body, and a reaction disc interposed between one end of the output shaft and the valve plunger;

characterized in that a rubber damper is disposed between and continuously separates the reaction disc and the valve plunger so that the reaction disc and valve plunger are free of direct contact with each other and a brake reaction from the output shaft is transmitted only through the rubber damper to the valve plunger, and an air gap is defined around the outer or the inner periphery of the rubber damper to permit an elastic deformation of the rubber damper.

2. A brake booster according to claim 1 in which a plate plunger which is slidably mounted on the valve body is disposed between the reaction disc and the rubber damper so that a brake reaction from the output shaft is transmitted through the reaction disc, the plate plunger, the rubber damper and the valve plunger to the input shaft.

3. A brake booster comprising a valve body slidably disposed within a shell, a valve plunger slidably mounted on the valve body and forming a valve mechanism, an input shaft for driving the valve plunger back and forth to switch a flow path in the valve mechanism, an output shaft slidably mounted on the valve body, and a reaction disc interposed between one end of the output shaft and the valve plunger;

characterized in that a rubber damper is disposed between the reaction disc and the valve plunger, wherein a portion of said valve plunger is allowed to extend through the rubber damper so as to define a first reaction transmission path which causes a brake reaction from the output shaft to be transmitted through the reaction disc, the rubber damper and the valve plunger to the input shaft and a second reaction transmission path which causes a brake reaction from the output shaft to be transmitted from the reaction disc to the valve plunger and the input shaft without being transmitted through the rubber damper, and an air gap is defined around the outer or the inner periphery of the rubber damper to permit an elastic deformation of the rubber damper.

4. A brake booster according to claim 3 in which a plate plunger which is slidably mounted on the valve body is disposed between the reaction disc and the rubber damper, the valve plunger slidably extending through the plate plunger, the brake reaction being transmitted in the first reaction transmission path from the reaction disc through the plate plunger to the rubber damper.

5. A brake booster according to claim 4 in which the plate plunger and the valve plunger are brought into abutment against each other before the brake booster reaches a full load condition, thereby allowing a brake reaction from the output shaft to be transmitted from the plate plunger directly to the valve plunger.

6. A brake booster comprising a valve body slidably disposed within a shell, a valve plunger slidably mounted on the valve body and forming a valve mechanism, an input shaft for driving the valve plunger back and forth to switch a flow path in the valve mechanism, an output shaft slidably mounted on the valve body, and a reaction disc interposed between one end of the output shaft and the valve plunger;

characterized in that a rubber damper is disposed between the reaction disc and the valve plunger so that a brake reaction from the output shaft is transmitted through the reaction disc, the rubber damper and the valve plunger to the input shaft, and that an air gap is defined around the outer or the inner periphery of the rubber damper to permit an elastic deformation of the rubber damper, in which a plate plunger, which is slidably mounted on the valve body, is disposed between the reaction disc and the rubber damper so that a brake reaction from the output shaft is transmitted through the reaction disc, the plate plunger, the rubber damper and the valve plunger to the input shaft, and in which the plate plunger and the valve plunger are brought into abutment against each other before the brake booster reaches a full load condition, thereby allowing a brake reaction from the output shaft to be transmitted from the plate plunger directly to the valve plunger.

\* \* \* \* \*